United States Patent
Bachnak et al.

(10) Patent No.: US 6,854,343 B2
(45) Date of Patent: Feb. 15, 2005

(54) TORQUE SENSOR FOR ELECTRIC POWER-ASSISTED STEERING SYSTEMS

(75) Inventors: Nouhad Bachnak, Speyer (DE); Stefan Stross, Dielheim (DE)

(73) Assignee: Tyco Electronics AMP GmbH, Bensheim (DE)

( * ) Notice: Subject to any disclaimer, the term of this patent is extended or adjusted under 35 U.S.C. 154(b) by 81 days.

(21) Appl. No.: 10/165,878

(22) Filed: Jun. 10, 2002

(65) Prior Publication Data

US 2003/0024325 A1 Feb. 6, 2003

(30) Foreign Application Priority Data

Jun. 29, 2001 (EP) .............................. 01115949

(51) Int. Cl.[7] .............................. G01L 3/02; G01L 3/10; G01L 3/12; G01L 3/14; G01L 1/00; G01L 5/00
(52) U.S. Cl. .............................. 73/862.334; 73/862.382
(58) Field of Search ..................... 73/862.334, 862.333, 73/862.382; 324/207.16, 207.19; 180/6.2, 444; 474/242

(56) References Cited

U.S. PATENT DOCUMENTS

| | | | | |
|---|---|---|---|---|
| 4,228,591 A | * | 10/1980 | Sterki et al. .................. 33/561 |
| 4,577,716 A | * | 3/1986 | Norton ....................... 180/79.1 |
| 5,232,417 A | * | 8/1993 | Amborn et al. ............. 475/252 |
| 5,233,906 A | * | 8/1993 | Bishop et al. ............ 91/375 A |
| 5,712,563 A | * | 1/1998 | Kawagoe et al. ....... 324/207.19 |
| 5,824,255 A | * | 10/1998 | Ross et al. ................... 264/316 |
| 6,318,188 B1 | * | 11/2001 | Yasui et al. ............ 73/862.333 |
| 6,364,050 B1 | * | 4/2002 | Horton ....................... 180/446 |
| 6,513,394 B1 | * | 2/2003 | Gutjahr et al. ......... 73/862.324 |

FOREIGN PATENT DOCUMENTS

DE 19834897 C1 10/1999 ............. G01L/3/02

* cited by examiner

*Primary Examiner*—Edward Lefkowitz
*Assistant Examiner*—Octavia Davis
(74) *Attorney, Agent, or Firm*—Barley Snyder

(57) ABSTRACT

Torsion in a shaft with two portions or a torsion bar caused by a torque is initially converted into an angular movement of a disc-shaped movement converter fastened to the first portion. A carrier surrounding the shaft as a sleeve is fastened to the second portion and converts the angular movement into an axial translation movement of the carrier which can be detected by a contactless displacement sensor.

20 Claims, 4 Drawing Sheets

TORQUE SENSOR FOR ELECTRIC POWER-ASSISTED STEERING SYSTEMS

FIELD OF THE INVENTION

The invention relates to a sensor for detecting the torque on a shaft such as a steering shaft.

DESCRIPTION OF THE PRIOR ART

Torque sensors for steering shafts are already known. For example, DE 198 34 897 C1 discloses a sensor of this type used in power-assisted steering systems of modern motor vehicles to measure the forces acting on the steering assembly. The measured values obtained in this way are then supplied as controlled variables to a control unit which calculates a signal for a preferably electric or electrohydraulic power-assisted steering system. These systems typically operate such that when the steering actuating force is below a predetermined torque threshold, power assist is minimized so the driver has to apply most of the steering force. Mechanical feedback is thus imparted to the driver. Above the predetermined torque threshold, the control unit provides power assistance and therefore uniform steering actuating force, so the steering actuating force to be applied by the driver is always within a comfortable range. The "spongy driving sensation" frequently criticised previously in power-assisted steering systems can therefore be avoided.

The sensor shown in DE 198 34 897 C1 is used to detect the rotational forces in a portion of the steering shaft so that the forces introduced into the steering shaft are transmitted by a torsion bar having a measuring cell. The steering force introduced therefore causes torsion which is detected by the measuring cell and measured, for example, as a strain by strain gauges (DMS). For safety reasons, a torsional angle limit is provided in the known sensor and this limits the difference in the twisting angle between the two portions of the steering shaft connected the sensor, so that malfunctioning of the measuring cell, for example by overloading and rupture of the torsion bar, does not lead to complete failure of the steering assembly.

In particular, sensors based on DMS and optical sensors are used in the automotive industry for torque measurement based on the measuring principle of evaluating torsion.

With sensors based on DMS, twisting of a torsion bar causes extension or compression of regions of its periphery and a resultant change in the resistance of the DMS. This change in resistance is evaluated and converted into a torque measurement. However, transmission of the signals from the DMS to the electronic evaluation device involves contact so that a special coil spring including a cable and a housing for cable guidance about the steering shaft is required for this purpose.

Optical torque sensors, on the other hand, have two masks which twist relative to one another when a torque is applied to the torsion bar. The light source and the receiver are secured to the housing. Relative twisting of the masks with respect to one another causes the receiver to detect a relatively large luminous flux and accordingly gives off a proportionally large signal current. While signal transmission is contactless in the optical sensors, the measuring arrangement is sensitive to strong vibrations that as occur in vehicles.

What is needed is an improved contactless but inexpensive torque sensor that is adaptable to the high vibration environment of a vehicle.

SUMMARY OF THE INVENTION

The invention provides a sensor having a disc-shaped movement converter being mechanically connected to a first portion of a shaft such that a torsion in the shaft or a torsion bar produces an angular movement of the movement converter.

A carrier surrounds the shaft in the form of a sleeve and is floatingly mounted thereon. One end of the carrier is directed toward the movement converter which is mechanically connected thereto in such a way that the twisting angle movement of the movement converter is converted into forces acting on the carrier with a helical line of action. The other end of the carrier is designed as a connecting piece and cooperates with a movement guide rigidly connected to the second portion of the shaft in such a way that the carrier cannot move helically but only linearly in the axial direction on the shaft.

A displacement sensor is provided so that the relative axial position of the carrier can be detected to determined the torque of the shaft by converting the twisting angle movement into an axial translation movement of the carrier.

The arrangement of this invention converts the rotational movement caused by the torque, into a translation movement namely travel of the carrier. This allows the torque on a torsion bar or on a torsion shaft to be detected using contactless position sensors such as displacement sensors, which operate on an inductive or magnetic field basis, for example Hall, PLCD or differential throttle sensors.

BRIEF DESCRIPTION OF THE DRAWINGS

The invention will now be described by way of example with reference to the accompanying figures of which.

DETAILED DESCRIPTION OF THE PREFERRED EMBODIMENT

Figure 1:
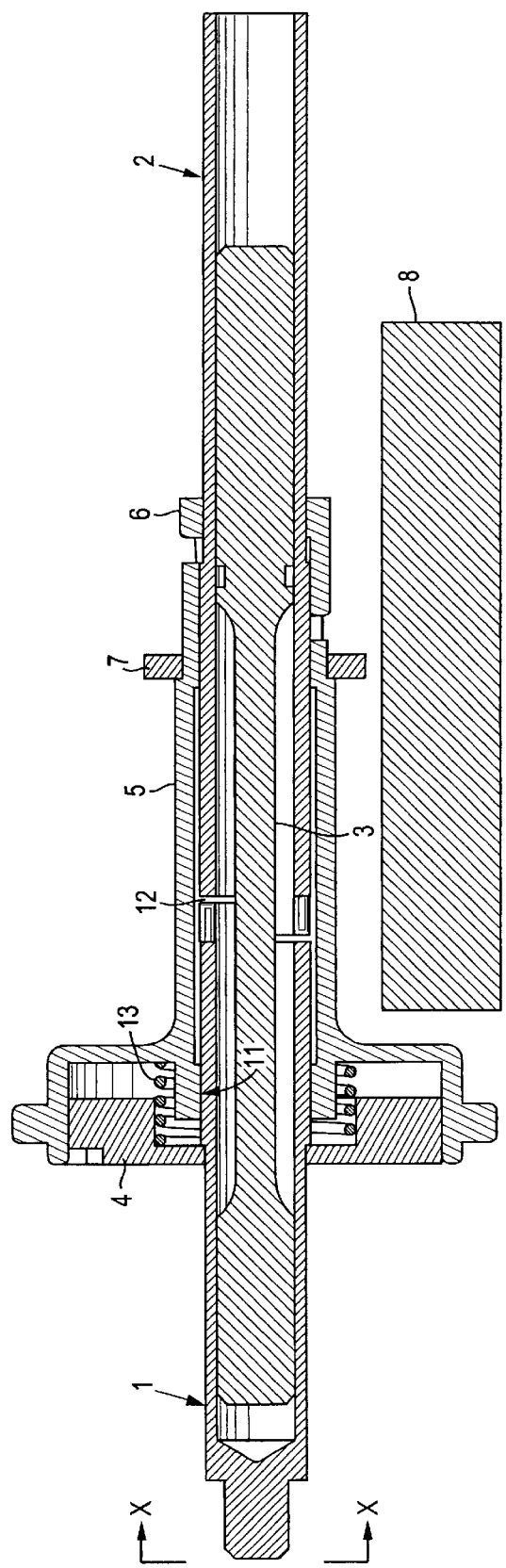
FIG. 1 is a lateral section of a sensor according to the invention.

FIG. 1 shows a sectional side view of a sensor substantially consisting of the two portions 1 and 2 of a steering shaft, the movement converter 4, the carrier 5, the movement guide 6 and the displacement sensor element 8. A steering wheel (not shown) of a motor vehicle is connected to the portion 2. The carrier 5 surrounding the shaft 1 and 2 like a sleeve is floatingly mounted with a fit 11 on the shaft 1 and 2. The carrier 5 can consequently be moved laterally, in other words along an axis of the shaft 1 and 2. The relative lateral position of the carrier 5 with respect to a measuring device arranged outside of the shaft 1 and 2, in particular a displacement sensor element 8, is evaluated for the measurement of the torque. A magnet 7, for example, can be arranged in a defined position on the carrier 5 for interaction with the displacement sensors.

Figure 3:
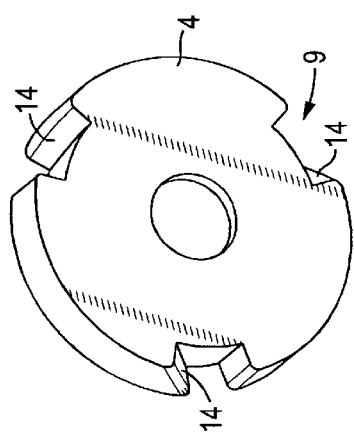
FIG. 3 is a perspective view of the movement converter.
Figure 4:
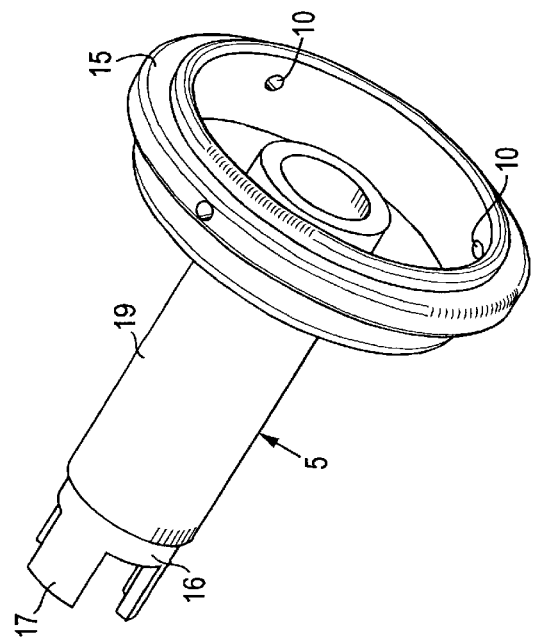
FIG. 4 is a perspective view of the carrier.
Figure 2:
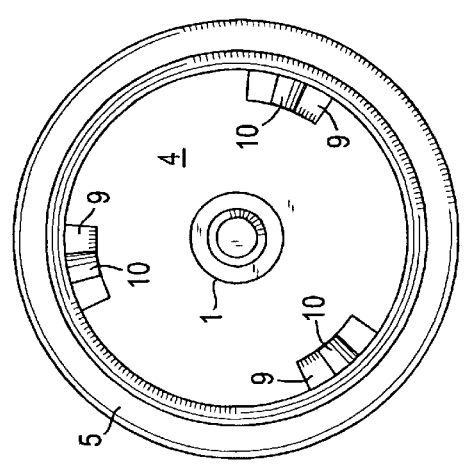
FIG. 2 is a cross sectional view of the sensor taken along the line X—X of FIG. 1.
Figure 5:
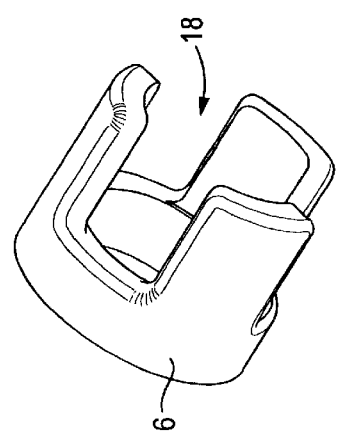
FIG. 5 is a perspective view of the movement guide of the sensor.
Figure 6:
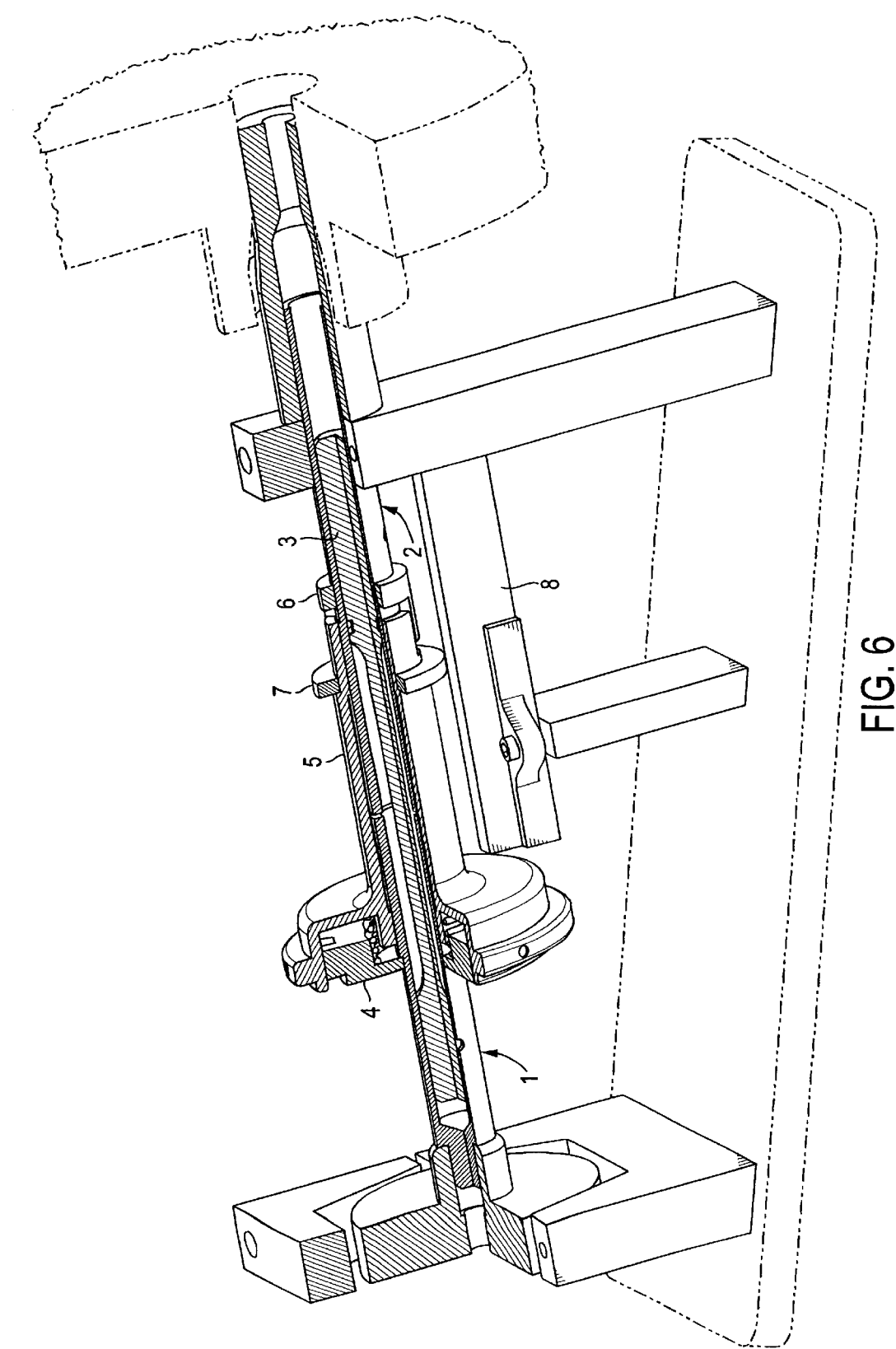
FIG. 6 is a partially sectional perspective view of the sensor.

Reference is now made to FIGS. 3 to 5 showing three essential individual components of the sensor, each in perspective view. The disc-shaped movement converter 4 is shown in FIG. 3 with a central aperture provided for fastening to the first portion 1 of the shaft. In addition, three recesses 9 are uniformly distributed over the periphery. One respective side of each recess 9 is designed as an oblique and bent-in or helical running face 14.

Figure 7:
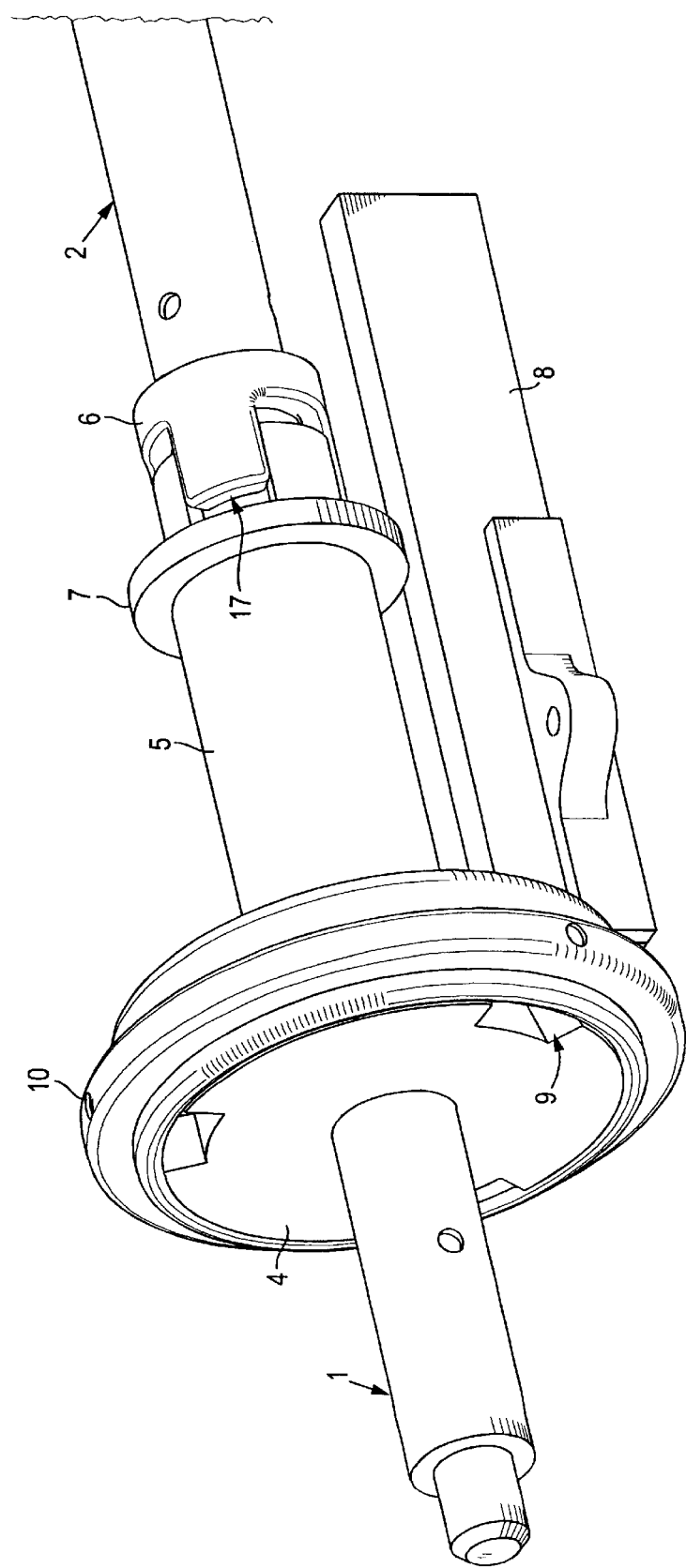
FIG. 7 is a perspective view of the sensor from a different viewpoint to FIG. 6.

The carrier 5 in FIG. 4 consists of the central sleeve-like portion 19 formed with an extension 15 at one end into which the movement converter 4 can be fitted in such a way that the pins 10 engage in the recesses 9. The other end of the carrier 5 is designed as a connecting piece 16 comprising elongate extensions 17 projecting in the axial direction and guided in corresponding grooves 18 of the movement guide 6 (FIG. 7) shown in FIG. 5.

Reference will now be made to FIG. 1 for further explanation and, in particular, the operation of the sensor resulting from the cooperation of the individual components. The two portions 1 and 2 of the shaft are connected to one another merely by means of the torsion bar 3. During a steering process the torsion bar 3 twists about a maximum of approximately +/−5°. The twisting or angular motion of the torsion bar 3 is linearly proportional to the torque applied thereto.

The portions 1 and 2 adjoining one another at the partition 12 are, as shown in FIG. 1, designed in such a way that the two portions have respective claws which engage complementary grooves. This construction acts as a torsion angle limit and is described in detail in the above-mentioned DE 198 34 897 C1.

The movement converter 4 is rigidly connected to the portion 1 of the steering column and the movement guide 6 is rigidly connected to the portion 2 of the steering column 2 and has at least one guide groove 18. The magnet 7 is in turn rigidly connected to the carrier 5.

The carrier 5 is floatingly mounted with a fit 11 on the steering column 1 and 2, the fit 11 serving for precise movement guidance. At one end the pins 10 are located in the carrier 5 on the running faces 14 of the movement converter 4 and are biased by a spring 13 against this running face 14. Upon twisting of the torsion bar 3 the pins 10 glide along the running faces 14 and accordingly attempt to helically move the carrier 5 as a whole, i.e. to rotate and laterally displace it simultaneously. However, at the other end of the carrier 5 the rotational movement of the carrier 5 is eliminated by the movement guide 6 which is rigidly connected to the portion 2 of the steering column. Movement is only possible in the axial direction, so that the angular movement of the torsion bar 3 is converted into a displacement of the magnet 7.

The position of the magnet 7 relative to the displacement sensor element 8 is evaluated by the electronic device and the torque consequently determined. With a linear position sensor having a permanent magnet, the output signal is linearly proportional to the lateral displacement or travel of the magnet 7.

For example, the torsion bar 3 can have a thickness of approximately 5 mm at the point of taper. The thickness of the movement converter disc 4 is approximately 10 mm, of which approximately 5 mm are available for the screwing movement. The effective travel depends on the diameter of the movement converter disc 4 and on the pitch of the slightly helical running face 14. With a diameter of approximately 45 mm travel of the carrier 5 of for example approximately +/−2.5 mm results.

The constructional design can also be configured differently from that illustrated with the same functional principle.

The spring 13 for example, can be removed if the pins 10 are forcibly guided in a groove instead of in the recess 9 in both directions of movement. Because of the integration of the movement guide 6 and the movement converter 4 in the steering column 1 and 2, the number of components can be reduced and the mechanism designed more compactly.

The torque sensor can also be attached to the pinion shaft to measure the torque on the steering assembly.

The advantages over known DMS measurement consist in the contactless transmission of the signals and in the omission of a coil spring. The robust, vibration-insensitive design is advantageous in comparison with optical sensors, and is particularly useful when using a PLCD (permanent linear magnet contactless displacement) sensor.

With regard to cost-efficiency the invention provides an inexpensive alternative to the above-described known sensors. In many applications the movement converter and/or the movement guide can be integrated in the shaft.

The mechanical connection between movement converter and the carrier can be made in different ways depending on the circumstances. In a relatively inexpensive design, the movement converter comprises at least one trench-like recess at its periphery, the recess being designed at least at one trench side as a running face extending slightly helically with respect to the axial direction, and in that the end of the carrier directed toward the movement converter is widened in such a way that a respective radially inwardly arranged pin engages from the outside in the recess of the movement converter, the guide means provided causing the pin to rest on the running face.

An embodiment of the sensor according to the invention in which a spring is arranged between movement converter and carrier and with the aid of which the pin is pressed against the running face is particularly well suited to this purpose.

A further particularly advantageous embodiment of the sensor using a displacement sensor based on a magnet is provided in that non-magnetic partitions are provided between the carrier with the magnet and the displacement sensor element, through which partitions the sensor can be controlled, and this is a substantial advantage in particular in conjunction with steering or gearing housings.

By using this mechanism it is possible to place the control magnets of a sensor on the steering column while the sensor element itself and the electronic evaluation device can be attached to the car body.

The applications of the sensor according to the invention are not limited to torque measurements in steering assemblies. It can also be provided in other applications functioning on the basis of a torsion bar. In particular in relatively short shafts, for example in household appliances, the sensor can also be attached without torsion bar, directly to a torsion shaft, the two portions 1 and 2 simply being provided by the opposing ends of the one-piece torsion shaft.

We claim:

1. A Sensor for detecting the torque on a shaft having two coaxially arranged portions, the first and second portions being connected by a torsion bar so that a torque acting on the shaft can be evaluated by the twisting of the torsion bar, the sensor comprising:

a disc-shaped movement converter being connected to the first portion of the shaft such that a torsion in the torsion bar produces an angular movement of the movement converter, a carrier surrounding the shaft and being floatingly mounted thereon with a fit, a first end of the carrier being directed toward the movement converter and mechanically connected thereto in such a way that the angular movement of the movement converter is converted into helical forces acting on the carrier, a second end of the carrier is located to be in cooperation with a movement guide being mechanically connected to the second portion of the shaft in such a way that the carrier cannot move helically but only linearly in the axial direction on the shaft, and a displacement sensor positioned adjacent the carrier so that the torque of the shaft can be determined by the angular movement converted into an axial translation movement of the carrier.

2. The sensor according to claim 1, wherein the movement converter has at least one recess along its periphery, the at least one recess having a running face extending slightly helically with respect to the axial direction.

3. The sensor according to claim 2 wherein the first end of the carrier comprises a radially inwardly arranged pin which engages the running face of the movement converter.

4. The sensor according to claim 3, further comprising a spring being arranged between movement converter and carrier and biased against the running face.

5. The sensor according to claim 3 wherein the recess in the movement converter is formed as a groove in which the pin can be forcibly guided in both directions of torsion and rotational movement.

6. The sensor according to claim 5 further comprising three recesses being uniformly distributed over the periphery of the movement converter.

7. The sensor according to claim 6 wherein the movement converter is integral with the shaft.

8. The sensor according to claim 6 wherein the movement guide is integral with the shaft.

9. The sensor according to claim 8 wherein the connecting piece comprises elongate extensions extending in the axial direction and guided in corresponding grooves in the movement guide.

10. The sensor according to claim 9 wherein the displacement sensor includes a displacement element positioned external the shaft and a magnet arranged on the carrier and mechanically connected thereto.

11. The sensor according to claim 9 further comprising a PLCD sensor or a Hall sensor arranged on the carrier to measure linear motion of the carrier relative to the shaft.

12. The sensor according to claim 9 further comprising a differential throttle sensor arranged on the carrier to measure linear motion of the carrier relative to the shaft.

13. The sensor according to claim 10 further comprising non-magnetic partitions provided between the carrier with the magnet and the displacement sensor element.

14. A Sensor for detecting the torque on a shaft having coaxial first and second portions, the first and second portions being connected by a torsion bar so that a torque acting on the shaft can be evaluated by the twisting of the torsion bar, the sensor comprising:

a disc-shaped movement converter having a plurality of helical running faces and being connected to the first portion of the shaft such that a torsion in the torsion bar produces an angular movement of the movement converter, a movement guide connected to the second portion of the shaft;

a carrier mounted surrounding the shaft and axially gloating thereon, a first end of the carrier being connected to the helical running faces of the movement converter, converting the angular movement of the movement converter into helical forces acting on the carrier, a second end of the carrier cooperating with the movement guide to limit the carrier to linearly motion in the axial direction on the shaft, and a displacement sensor positioned adjacent the carrier so that the torque of the shaft can be determined by the angular movement converted into an axial translation movement of the carrier.

15. The sensor according to claim 14 wherein the first end of the carrier comprises a radially inwardly arranged pin which engages the running face of the movement converter.

16. The sensor according to claim 15, further comprising a spring being arranged between the movement converter and the carrier and biased against the running face.

17. The sensor according to claim 16 further comprising three recesses being uniformly distributed over the periphery of the movement converter.

18. The sensor according to claim 14 wherein the displacement sensor includes a displacement element positioned external the shaft and a magnet arranged on the carrier and mechanically connected thereto.

19. The sensor according to claim 14 further comprising a PLCD sensor or a Hall sensor arranged on the carrier to measure linear motion of the carrier relative to the shaft.

20. The sensor according to claim 14 further comprising a differential throttle sensor arranged on the carrier to measure linear motion of the carrier relative to the shaft.

* * * * *

UNITED STATES PATENT AND TRADEMARK OFFICE
CERTIFICATE OF CORRECTION

PATENT NO.    : 6,854,343 B2
DATED         : February 15, 2005
INVENTOR(S)   : Bachnak et al.

It is certified that error appears in the above-identified patent and that said Letters Patent is hereby corrected as shown below:

Column 6,
Line 16, "the shaft and axially gloating" should read -- the shaft and axially floating --.

Signed and Sealed this

Fourteenth Day of February, 2006

JON W. DUDAS
*Director of the United States Patent and Trademark Office*